United States Patent [19]
Shah et al.

[11] Patent Number: 6,019,320
[45] Date of Patent: Feb. 1, 2000

[54] SPACECRAFT ACQUISITION OF SUN POINTING

[75] Inventors: Piyush R. Shah, Germantown, Md.; Douglas J. Bender, Redondo Beach, Calif.

[73] Assignee: Hughes Electronics Corporation, Los Angeles, Calif.

[21] Appl. No.: 09/153,123

[22] Filed: Sep. 15, 1998

[51] Int. Cl.$^7$ .................................................. B64G 1/24
[52] U.S. Cl. .......................... 244/171; 244/173; 244/164
[58] Field of Search .................................... 244/171, 173, 244/164

[56] References Cited

U.S. PATENT DOCUMENTS

| | | | |
|---|---|---|---|
| 4,358,076 | 11/1982 | Lange et al. . | |
| 5,133,518 | 7/1992 | Flamet | 244/173 |
| 5,255,879 | 10/1993 | Yocum et al. . | |
| 5,257,759 | 11/1993 | Bender | 244/171 |
| 5,816,540 | 10/1998 | Murphy et al. | 244/164 |
| 5,906,338 | 5/1999 | Surauer et al. | 244/171 |

*Primary Examiner*—J. Woodrow Eldred
*Attorney, Agent, or Firm*—Terje Gudmestad; Georgann Grunebach; Michael W. Sales

[57] ABSTRACT

A system and method for acquiring Sun pointing in a three-axis stabilized spacecraft including slewing at least one solar wing until the Sun is detected, determining an initial Sun vector, performing one or more rotations of the spacecraft body so as to bring the instantaneous Sun vector coincident with a preferred final Sun vector, at least one rotation about an optimal axis, and slewing at least one solar wing to a preferred attitude relative to the Sun. In one embodiment, the optimal axis is chosen so as to minimize the time required to achieve an optimal thermal attitude. In another embodiment, the optimal axis is chosen so as to minimize the time required to align the instantaneous Sun vector with the final desired Sun vector. In a further embodiment, the optimal axis is chosen so as to maintain Earth lock.

14 Claims, 6 Drawing Sheets

SPACECRAFT ACQUISITION OF SUN POINTING

TECHNICAL FIELD

The present invention relates in general to attitude control of a spacecraft and in particular to acquisition of Sun pointing by a three-axis stabilized spacecraft with solar wings.

BACKGROUND ART

Many three-axis stabilized spacecraft utilize solar wings to generate electrical energy. In order to maximize the energy output, the solar wings must be properly oriented towards the Sun. Spacecraft also often use radiators to eliminate waste heat. These radiators must not be oriented towards the Sun in order to properly function. Spacecraft may also have mission objectives that require a specific attitude relative to the Sun and other celestial bodies such as the Earth.

Time and energy is expended by a spacecraft when modifying its attitude. Minimizing time avoids thermal problems and reduces battery drainage. Minimizing energy expenditure conserves the limited amount of fuel normally carried by a spacecraft.

Current methods acquire a solar-pointing attitude by slewing the spacecraft one axis at a time. A typical solar orientation may require three phases: pitch search, keyhole maneuver and yaw search. Consider, for example, the following typical sequence of actions and associated execution times.

The spacecraft first performs a pitch scan to search for the Sun. A 360 degree pitch scan at a typical search rate of 0.75 degrees per second takes 8 minutes. During the pitch search phase, the solar wings are slewed to face the roll axis. If the pitch search is unsuccessful, the Sun is assumed to be in the sensor blind spot or keyhole. In this case, a one time 75 degree yaw slew at a typical search rate of 0.25 degrees per second takes 5 minutes. Adding 8 minutes for a second pitch search yields 13 minutes for the keyhole maneuver. Once the spacecraft locks onto the Sun in pitch, the spacecraft performs a yaw scan while maintaining Sun-lock in pitch. A 45 degree yaw slew at a typical search rate of 0.25 degrees per second takes 3 minutes. The total maximum time for the above procedures is 24 minutes.

Modifications to the above sequence have been proposed, but none significantly reduce the worst-case acquisition time.

An additional problem with existing solar acquisition methods is that the large search rate about the body pitch axis generally requires large momentum wheel storage requirements.

A further problem occurs in Sun-nadir steered spacecraft, where Earth-lock can be lost during the solar acquisition sequence.

SUMMARY OF THE INVENTION

As such, one object of the present invention is to quickly place the spacecraft in a safe power state. This reduces the overall time required for Sun acquisition and improves chances for survival if attitude anomalies occur following an eclipse when the initial battery state of charge is low.

Another object of the present invention is to quickly place the spacecraft in a safe thermal state by minimizing Sun impingement on the radiators.

Another object of the present invention is to reduce the storage requirements in momentum wheels by eliminating the large search rate about the body pitch axis.

A further object of the present invention is to maintain Earth lock while acquiring the Sun.

In carrying out the above objects and other objects and features of the present invention, a method is provided to rotate a spacecraft about an optimal axis, thereby minimizing the time and energy required to orient the spacecraft to a desired Sun angle. As a consequence, the spacecraft is quickly placed in a safe power and thermal attitude.

In one embodiment, a solar search is made by slewing the solar wings in opposite directions about the pitch axis until the Sun is incident on at least one wing. This is followed by rotating the spacecraft body about an axis determined by the cross product of the instantaneous Sun vector with a projection of the instantaneous Sun vector into the roll-yaw plane. This brings the spacecraft into a safe thermal attitude and moves at least one wing into optimal solar attitude. The spacecraft is then rotated about the pitch axis to bring the body into the desired solar attitude. At the same time, each solar wing is rotated with respect to the spacecraft body so as to maintain or obtain Sun lock.

A modification of this embodiment executes the roll-yaw body rotation, the pitch body rotation, and final solar wing slew simultaneously.

In another embodiment, a solar search is made by slewing the solar wings in opposite directions. This is followed by rotating the spacecraft body about an axis determined by the cross product of the initial Sun vector with the desired final Sun. During body rotation, the solar wings are rotated to maintain or obtain solar lock.

In still another embodiment, Earth lock is maintained while acquiring the Sun. A solar search is made by slewing the solar wings in opposite directions. This is followed by rotating the spacecraft about the Earth vector until the Sun vector lies in the roll-yaw plane. During body rotation, the solar wings are rotated to maintain or obtain solar lock.

In any of the above embodiments, solar wings that may rotate in the same direction may be substituted for solar wings that may rotate in opposite directions.

A system is also provided in accordance with the present invention. Sensors on the north and south solar wings determine Sun position relative to the spacecraft. Using this information, a control logic determines actions for north and south solar wing drives, a reaction wheel system, and thrusters.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
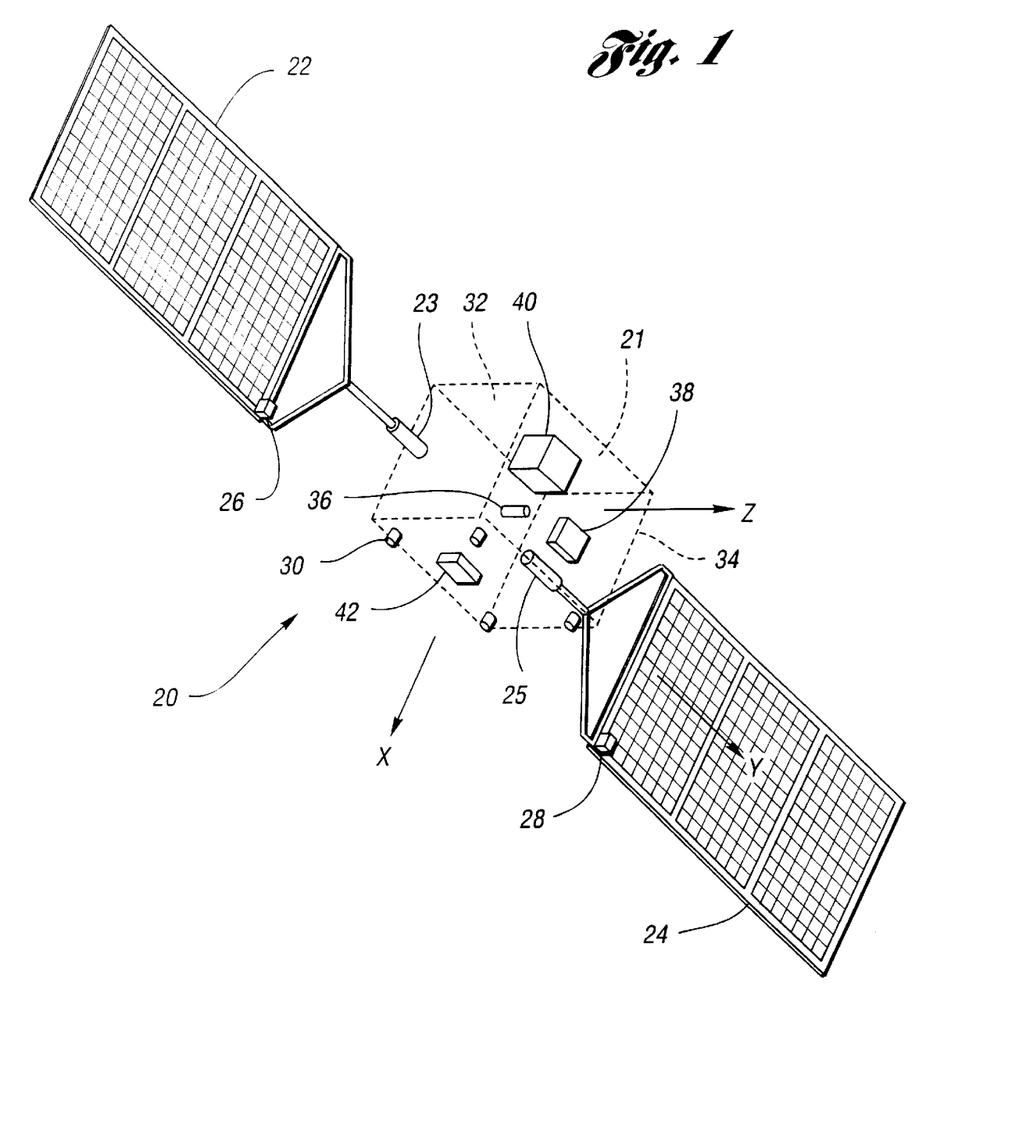
FIG. 1 is a graphical representation of a spacecraft that may use the method according to the present invention.

Referring now to FIG. 1, a graphical representation of a spacecraft that may use the present invention is shown. A spacecraft, shown generally as 20, has an orthonormal body reference frame shown as roll axis x, pitch axis y, and yaw axis z. Spacecraft 20 includes a main body 21. One face of body 21 such as, for example, the positive x face, is to be oriented towards the Sun.

A north solar wing 22 is connected to the negative y face of body 21 so as to rotate about an axis parallel to the pitch axis relative to body 21. North wing 22 is caused to rotate by north solar wing drive 23. A south solar wing 24 is connected to the positive y face of body 21 so as to rotate about an axis parallel to the pitch axis relative to body 21. South wing 24 is caused to rotate by south solar wing drive 25. In a preferred embodiment solar wings 22 and 24 can be rotated in either the same direction or in opposite directions simultaneously. In another embodiment, solar wings 22 and 24 must be rotated in the same direction.

In a preferred embodiment, a pair of array mounted slit Sun sensors is used. A north Sun sensor array 26 is rotatively mounted on north solar wing 22. A south Sun sensor array 28 is rotatively mounted on south solar wing 24. Each sensor has at least one slit sensor with pitch as its sensitive axis and at least one slit sensor with its sensitive axis orthogonal to pitch. In another embodiment, the amount of electrical current generated from solar cells mounted to solar wings 22 and 24 is used to determine the direction of the Sun. The invention disclosed herein is not dependent on the precise method for determining the direction of the Sun. Various types of solar sensors such as single slit Sun sensors mounted on one or both wings may be used as will be recognized by one or ordinary skill in the art.

Spacecraft 20 includes actuators for affecting attitude maneuvers. These are shown as thrusters 30 and reaction wheel system 40. Other actuators may be used as is known in the art.

Spacecraft 20 may include radiators for eliminating waste heat. A north radiator 32 is on the positive y side of spacecraft body 21 and a south radiator 34 is on the negative y side of spacecraft body 21.

Spacecraft 20 may include a desired attitude towards a celestial target. For example, the mission may require one face of spacecraft body 21 to be oriented towards Earth. For the spacecraft depicted in FIG. 1, a static Earth sensor 36 is mounted on the positive z face of body 21 with boresight parallel to the yaw axis.

Spacecraft 20 may also include attitude determination sensors such as, for example, three-axis gyroscope package 38. These sensors assist in orienting and stabilizing spacecraft 20, as is well known in the art.

A control logic 42, in communication with solar wing drives 23 and 25, Sun sensor arrays 26 and 28, thrusters 30, Earth sensor 36, gyroscope package 38, and reaction wheel system 40, accepts input from sensors and produces signals to actuators and drives so as to carry out the present invention.

Figure 2:
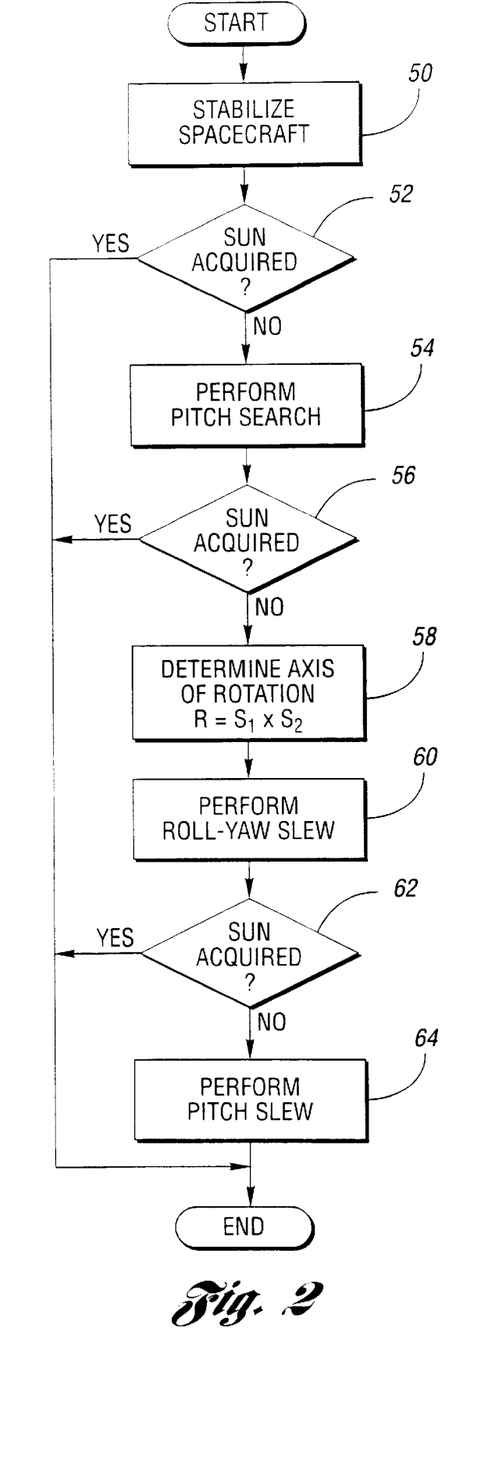
FIG. 2 is a flow diagram representing operation of a system or method for minimizing the time required to place the spacecraft in an optimal thermal attitude according to an embodiment of the present invention.
Figure 4:
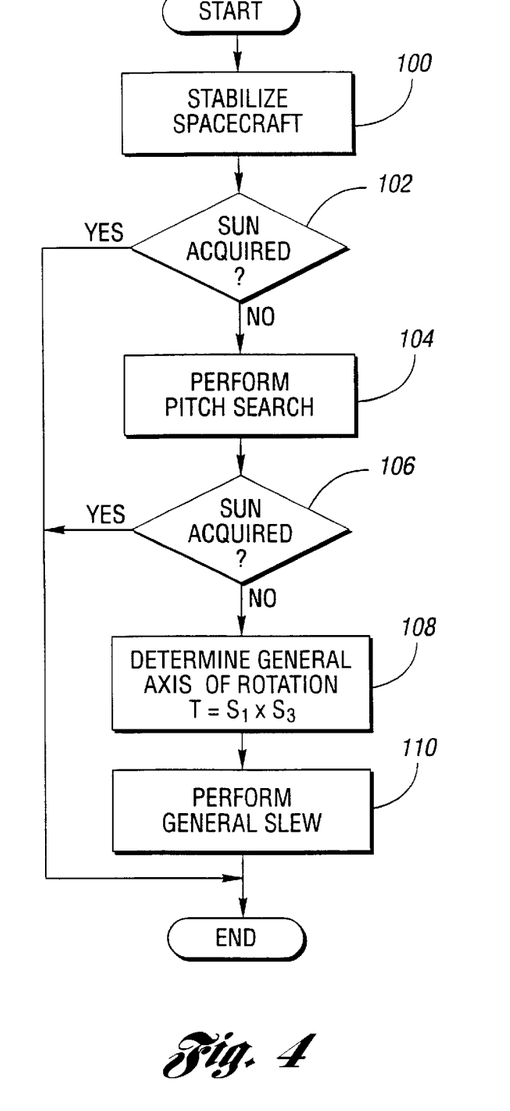
FIG. 4 is a flow diagram representing operation of a system or method for minimizing the time required to place the spacecraft in a preferred final attitude relative to the Sun according to an embodiment of the present invention.
Figures 6, 8:
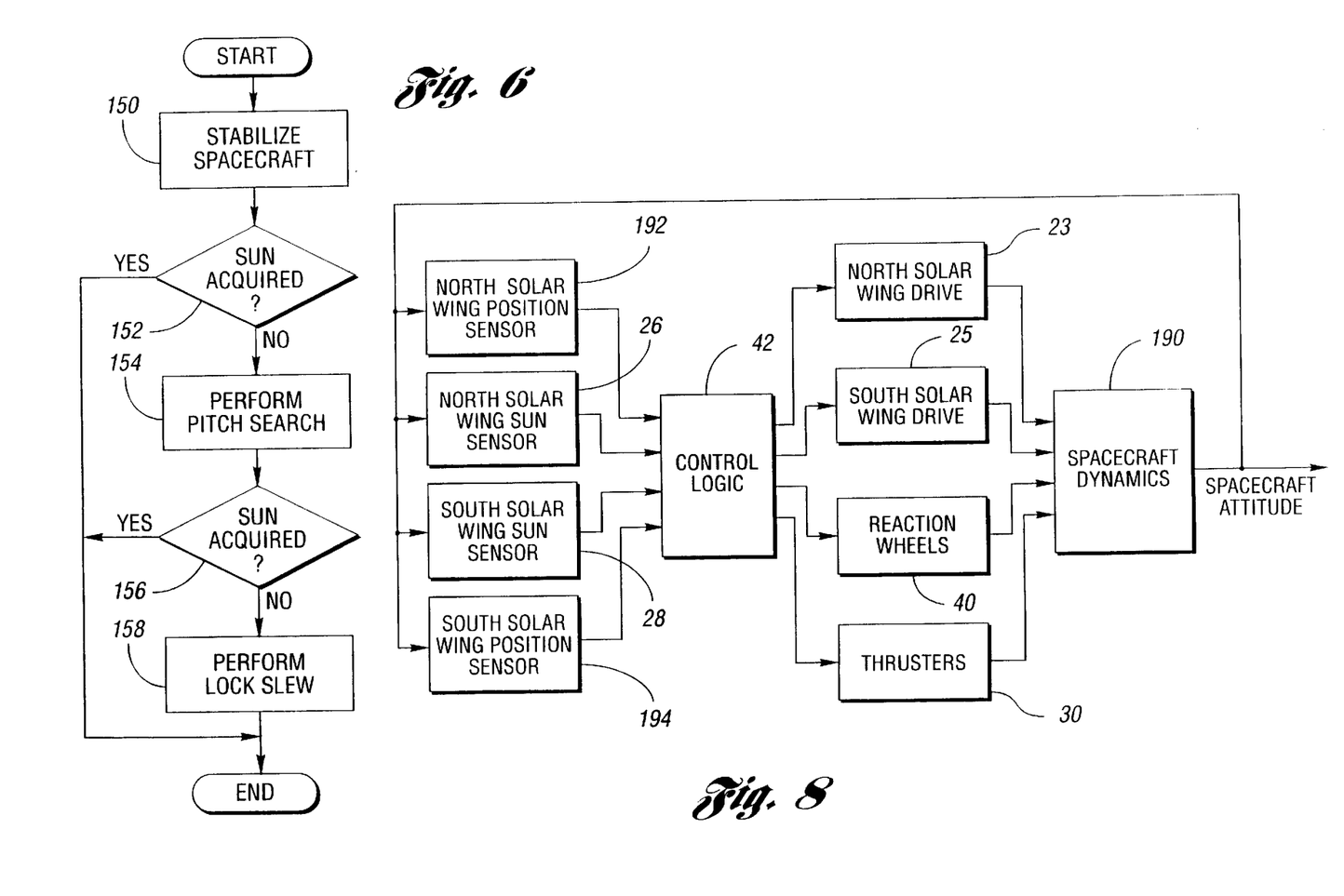
FIG. 6 is a flow diagram representing operation of a system or method for maintaining Earth lock while acquiring the Sun according to an embodiment of the present invention.
FIG. 8 is a block diagram of a system for effecting a satellite maneuver in accordance with the present invention.

Referring now to FIGS. 2, 4 and 6, flow diagrams of three embodiments of the present invention are shown. As will be appreciated by one of ordinary skill in the art, the operations illustrated in each flow diagram are not necessarily sequential operations. Similarly, operations may be controlled by software, hardware, or a combination of both. The present invention transcends any particular implementation and each of various embodiments is shown in a sequential flow chart form for ease of illustration.

Figure 3:
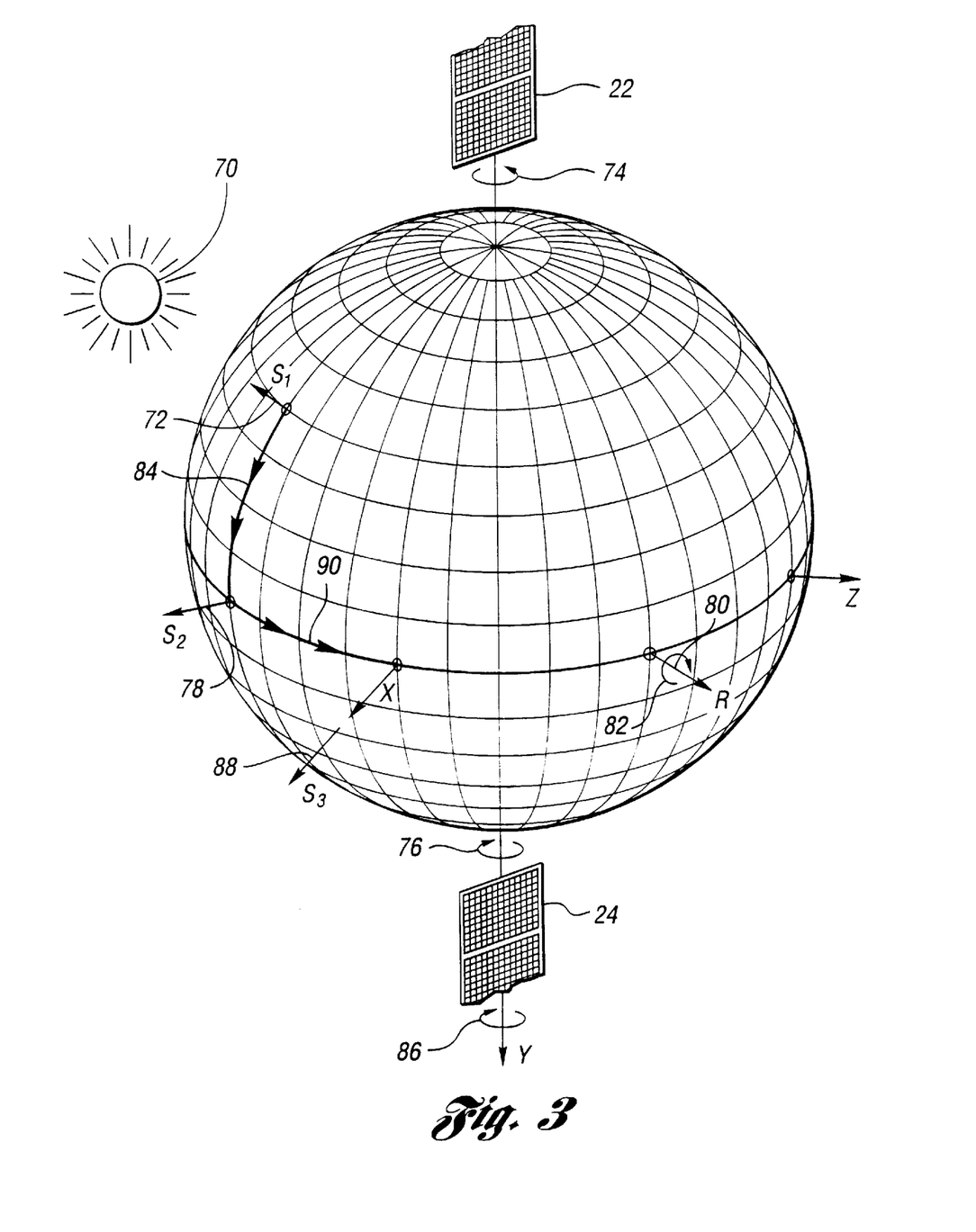
FIG. 3 is a polar plot illustrating a spacecraft maneuver for minimizing the time required to place the spacecraft in an optimal thermal attitude in accordance with an embodiment of the present invention.
Figure 5:
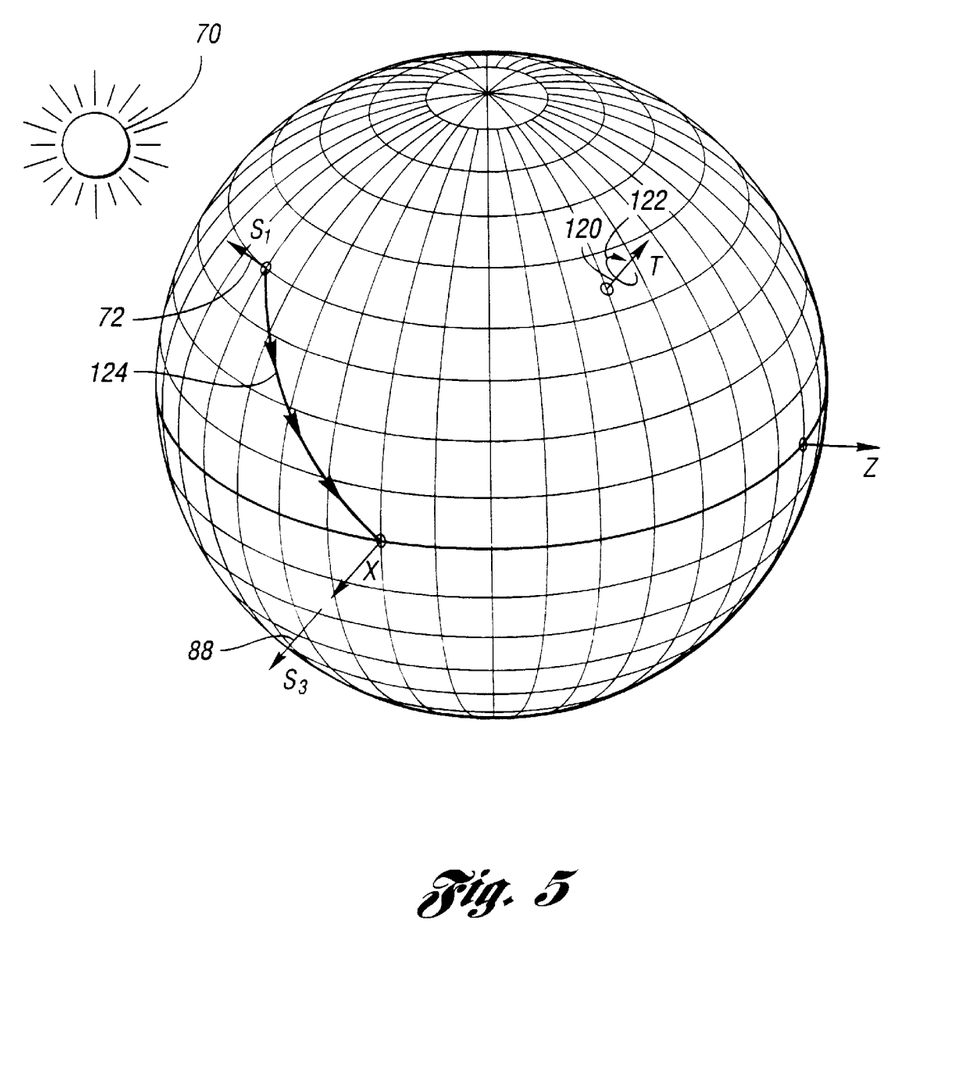
FIG. 5 is a polar plot illustrating a spacecraft maneuver for minimizing the time required to place the spacecraft in a preferred final attitude relative to the Sun in accordance with an embodiment of the present invention.
Figure 7:
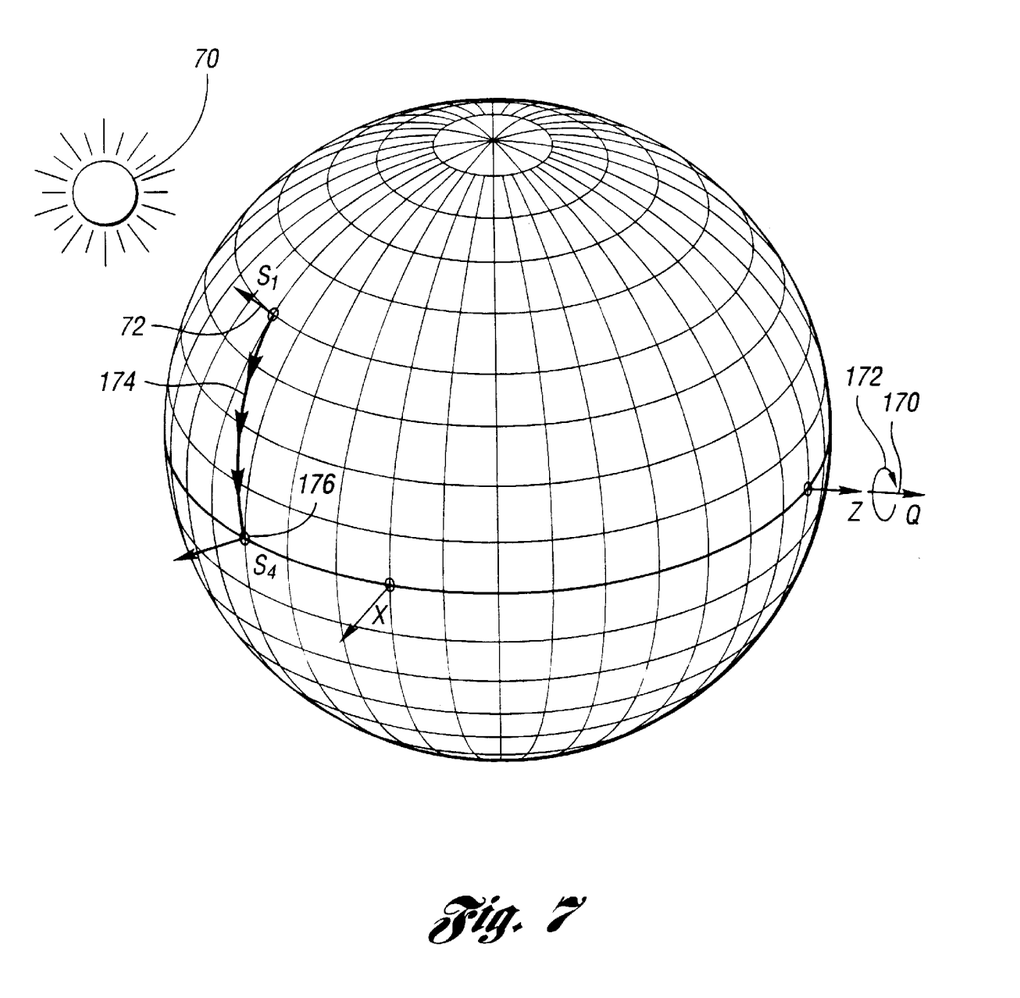
FIG. 7 is a polar plot illustrating a spacecraft maneuver for maintaining Earth lock while acquiring the Sun in accordance with an embodiment of the present invention.

Referring now to FIGS. 3, 5 and 7, polar plots are shown. In each plot, spacecraft 20 is thought of as being at the center of the sphere with axes on the plot corresponding to the body reference frame. The y axis extends through the south pole and both the x and z axes extend through the equator. For all embodiments shown, the Sun starting position relative to the spacecraft body reference is shown as 70 and the initial Sun vector, $S_1$, is shown as 72.

Referring now to FIG. 2, a flow diagram, and to FIG. 3, a polar plot, an embodiment of the present invention for minimizing the time required to obtain optimal thermal attitude is shown.

Spacecraft 20 is first stabilized, as in block 50 of FIG. 2. This results when angular rates about all three axes have been nulled. Methods for stabilizing a three-axis stabilized spacecraft are well known in the art.

If, at the end of stabilization, solar acquisition has occurred, the method has completed as shown in block 52.

If solar acquisition has not occurred, a pitch search is performed, as in block 54. In one search method, the solar wings are slewed about the pitch axis in the same direction until the Sun is detected. A 360 degree pitch scan at a typical solar wing slew rate of 2.45 degrees per second takes approximately 2.5 minutes.

A preferred search method slews each wing about the pitch axis in an opposite direction. This will require at most a 180 degree pitch scan requiring no more than 1.25 minutes at 2.45 degrees per second before the Sun is acquired by at least one wing. In addition to requiring less worst-case time, an additional benefit of slewing the wings in opposite directions is that rotational momentum remains unchanged by the operation.

Referring now to FIG. 3, a polar plot of an example of an embodiment minimizing the time required to obtain optimal thermal attitude is shown. North solar wing 22 is rotated in direction 74 while south solar wing 24 is rotated in direction 76. Ideally, because spacecraft body 21 is not moved, the Sun remains in the same relative position as indicated by Sun vector $S_1$.

An additional search step may be required for Sun sensors with a blind region in pitch such as single slit Sun sensors, a Sun sensor array on only one wing, or solar cell current sensors. If the pitch search does not locate the Sun, a keyhole maneuver is started. In this case, a slew about the yaw axis followed by an additional pitch search is required. A 75 degree yaw slew at a typical search rate of 0.25 degrees per second takes 5 minutes.

Once the pitch search is completed, one or both solar wings have acquired the Sun as best as is possible without rotating spacecraft body 21.

Referring again to FIG. 2, if the Sun is acquired, implying that the Sun vector started aligned with the x axis, the method has completed as shown in block 56.

If the Sun is not acquired, an axis about which to rotate the spacecraft body is determined as shown in block 58. This axis is designed to place the spacecraft in a safe thermal attitude as quickly as possible. Safe thermal attitude occurs if the Sun vector lies in the roll-yaw plane since north radiator 32 and south radiator 34 are normal to the pitch axis. The shortest rotation placing the Sun vector in the roll-yaw plane moves $S_1$ to its projection onto the roll-yaw plane, $S_2$. This rotation is about an axis in the x-z plane normal to the Sun line or, mathematically, is the cross product of $S_1$ and $S_2$.

A roll-yaw slew is then performed by the spacecraft as in block 60. At the end of this maneuver, the Sun vector is in the x-z plane. The roll-yaw slew is limited to 90 degrees. A typical slew rate of 0.25 degrees per second results in a maximum time of 6 minutes.

If solar wings 22 and 24 were rotated in the same direction during the pitch search, both wings have now acquired the Sun. This places spacecraft 20 in safe power attitude as well as safe thermal attitude. If solar wings 22 and 24 were rotated in opposite directions, at least one solar wing has acquired the Sun.

A safe thermal and power attitude has been obtained in no more than 8.5 minutes for a typical spacecraft with solar wings 22 and 24 rotated in the same direction during the pitch search.

Referring now to FIG. 3, the roll-yaw maneuver is shown on the polar plot. $S_2$, shown as 78, is the projection of initial Sun vector 72 onto the x-z plane. The cross product of vector 72 and vector 78 is axis of rotation R, shown as 80. Direction of rotation about R, shown as 82, is determined so as to minimize the angle from $S_1$ to $S_2$. The path of the Sun vector during rotation is shown as 84.

Referring again to FIG. 2, if the Sun is acquired on the desired spacecraft axis, implying that the Sun vector started in the x-y plane, the method is completed as shown in block 62.

If the Sun is not acquired, a pitch slew is performed, as shown by block 64. Spacecraft 20 is rotated about the y axis until spacecraft body 21 is facing in the desired attitude. This implies that the instantaneous Sun vector is coincident with the preferred final Sun vector. For the spacecraft embodiment described previously in FIG. 1, a vector normal to the positive x face is pointed at the Sun.

In a preferred embodiment, solar wings 22 and 24 are rotated during pitch slew. If either wing has previously acquired the Sun, it is slewed to remain Sun-pointing while spacecraft body 21 is rotated. If either wing has not acquired the Sun, it is rotated until the Sun is acquired. In another embodiment, solar wings 22 and 24 are rotated in a separate step following the pitch slew.

Referring now to FIG. 3, the pitch slew maneuver is shown on the polar plot. Rotation about the y axis, shown as 86, moves the Sun vector from $S_2$ 78 to $S_3$ 88. The path of the Sun vector during the maneuver is shown as 90.

In alternate embodiments, the roll-yaw slew and the pitch slew may be executed sequentially as implied by paths 84 and 90 or may be executed simultaneously.

Referring now to FIG. 4, a flow diagram, and to FIG. 5, a polar plot, an embodiment of the present invention for minimizing the time required to align the instantaneous Sun vector with the preferred final Sun vector is shown. This embodiment can be used on spacecraft with Sun sensors that provide two axes of information. For comparison purposes, initial Sun vector $S_1$, shown as 72, and preferred final Sun vector $S_3$, shown as 88, are the same in both FIG. 5 and FIG. 3.

Referring now to FIG. 4, spacecraft 20 must be stabilized as shown in 100. If the Sun is acquired as a result of stabilization, the method has completed as shown in 102.

A pitch search is performed, as shown in 104. This is identical to the pitch search associated with block 54 in FIG. 2. At the end of the pitch search, the current Sun vector is coincident with initial Sun vector $S_1$, shown as 72. If the Sun is acquired as a result of the pitch search, the method has completed as shown in 106.

If the Sun is not acquired at the end of the pitch search, a general axis of rotation is determined, as shown by block 108. This axis, T, is chosen to minimize the angular distance between initial Sun vector 72 and desired final Sun vector 88. The axis T is found by taking the cross product of $S_1$ and $S_3$.

A general slew is performed, as shown in 110. The slew is about axis of rotation T in a direction that minimizes the angular distance between $S_1$ and $S_3$. This angular distance is limited to at most 180 degrees.

In a preferred embodiment, solar wings 22 and 24 are rotated during the general slew. If either wing has previously acquired the Sun, it is slewed to remain Sun-pointing while spacecraft body 21 is rotated. If either wing has not acquired the Sun, it is rotated until the Sun is acquired. In another embodiment, solar wings 22 and 24 are rotated in a separate step following the general slew.

Referring now to FIG. 5, an example is illustrated. Axis for the general slew T is shown as vector 120. The slew direction is shown as 122. The path of the instantaneous Sun vector during the maneuver is shown as 124.

Referring now to FIG. 6, a flow diagram, and to FIG. 7, a polar plot, another embodiment of the present invention is shown. This embodiment can be used to maintain a lock on a celestial body such as the Earth while acquiring the Sun. For comparison purposes, initial Sun vector $S_1$, shown as 72, is the same in both FIG. 7 and FIG. 3.

Referring now to FIG. 6, spacecraft 20 must be stabilized as shown in 150. If the Sun is acquired as a result of stabilization, the method has completed as shown in 152.

A solar wing pitch search is performed, as shown in 154. This is identical to the pitch search associated with block 54 in FIG. 2. At the end of the pitch search, the current Sun vector is coincident with initial Sun vector $S_1$, shown as 72. If the Sun is acquired as a result of the pitch search, the method has completed as shown in 156.

In order to maintain lock, spacecraft 20 must rotate about the Earth vector, designated by lock axis Q. The lock slew is performed, as in block 158, from Sun vector position $S_1$ until the instantaneous Sun vector is in the x-z plane. The final Sun vector position is designated $S_4$. Unless the angle between the Earth vector and Sun vector correspond with the angle between the Earth sensor boresight and the normal to the desired Sun-facing spacecraft body surface, an optimal safe thermal attitude cannot be obtained.

In a preferred embodiment, solar wings 22 and 24 are rotated during the lock slew. If either wing had previously acquired the Sun, it is slewed to remain Sun-pointing while spacecraft body 21 is rotated. If either wing had not acquired the Sun, it is rotated until the Sun is acquired. In another embodiment, solar wings 22 and 24 are rotated in a separate step following the lock slew.

Referring now to FIG. 7, an example of solar acquisition with Earth lock is shown. Lock axis Q is shown as 170. The lock slew direction is shown as 172. The path of the instantaneous Sun vector during the maneuver is shown as 174. The final Sun vector position is shown as 176.

Referring now to FIG. 8, a block diagram of a system for effecting a spacecraft maneuver according to the present invention is shown. North solar wing Sun sensor 26 and south solar wing Sun sensor 28 are operative to detect the position of the Sun relative to spacecraft 20. North solar wing position sensor 192 and south solar wing position sensor 194 are operable to detect the position of the respective wing relative to spacecraft body 21. Sun sensor and wing position sensor measurements are read by control logic 42, which is in communication with solar wing Sun sensors 26 and 28, solar wing position sensors 192 and 194, as well as north solar wing drive 23, south solar wing drive 25, reaction wheel system 40, and thrusters 30. Control logic 42 is operative to perform the method described with regards for FIGS. 2 through 7 above. Control logic 42 develops solar wing drive commands for solar wing drives 23 and 25, wheel commands for reaction wheel system 40, and thruster commands for thrusters 30, so as to obtain a desired attitude for spacecraft 20 and solar wings 22 and 24. Solar wing angles, wheel torques and thruster pulses affect spacecraft attitude through spacecraft dynamics 190.

While the best mode for carrying out the present invention has been described in detail, and several alternative embodiments have been presented, those familiar with the art to which this invention relates will recognize various alternative designs and embodiments within the scope and spirit of the present invention as defined by the following claims.

What is claimed is:

1. A method for acquiring Sun pointing in a three-axis stabilized spacecraft with roll, pitch, and yaw mutually orthogonal axes, wherein the spacecraft has a body, the Sun having an attitude relative to the body expressed as the instantaneous Sun vector, the Sun having an initial attitude relative to the body expressed as an initial Sun vector and the Sun having a preferred attitude relative to the body expressed as a preferred final Sun vector, wherein the spacecraft also includes at least one solar wing, the at least one solar wing rotatable about an axis parallel to the pitch axis, and the at least one solar wing having a preferred attitude relative to the Sun, and wherein the spacecraft further has at least one Sun sensor coupled to rotate with at least one solar wing, each Sun sensor operable to detect the attitude of the Sun relative to the solar wing to which the Sun sensor is attached within the Sun sensor field of view, the method comprising:

slewing at least one solar wing until the Sun is detected;
determining the initial Sun vector;
performing one or more rotations of the spacecraft body so as to bring the instantaneous Sun vector coincident with the preferred final Sun vector, wherein at least one rotation is about an optimal axis; and
slewing at least one solar wing to the preferred attitude relative to the Sun.

2. A method of acquiring Sun pointing as in claim 1 wherein the step of performing one or more rotations and the step of slewing at least one solar wing to the preferred attitude relative to the Sun are executed simultaneously.

3. A method of acquiring Sun pointing as in claim 1, wherein the at least one solar wing includes a north solar wing extending generally from the negative pitch face of the spacecraft body and a south solar wing extending generally from the positive pitch face of the spacecraft body, the method of slewing the solar wings until the Sun initial vector is obtained comprises rotating the north solar wing in the opposite rotational direction as the south solar wing.

4. A method of acquiring Sun pointing as in claim 1, wherein the at least one Sun sensor on the at least one solar wing permits an initial Sun vector attitude which cannot be observed as the at least one solar wing is slewed, the method of slewing the at least one solar wing comprising;

slewing the at least one solar wing a first time up to one revolution;
rotating the spacecraft body about an axis normal to the pitch axis if the first slew does not determine the initial Sun vector; and
slewing the at least one solar wing a second time up to one revolution if the first slew does not determine the initial Sun vector.

5. A method of acquiring Sun pointing as in claim 1, wherein the method of performing one or more rotations comprises:

projecting the initial Sun vector onto the roll-yaw plane;
determining the optimal axis of rotation by taking the cross product of the initial Sun vector with the projection of the initial Sun vector onto the roll-yaw plane;
rotating the spacecraft body about the optimal axis such that the instantaneous Sun vector is moved from the initial Sun vector to the projection of the initial Sun vector onto the roll-yaw plane; and
rotating the spacecraft body about the pitch axis until the instantaneous Sun vector is coincident with the preferred final Sun vector.

6. A method of acquiring Sun pointing as in claim 1, wherein the method of performing one or more rotations comprises:

determining an optimal axis of rotation by taking the cross product of the initial Sun vector with the preferred final Sun vector; and
rotating the spacecraft body about the optimal axis until the instantaneous Sun vector is coincident with the preferred final Sun vector.

7. A method of acquiring Sun pointing as in claim 1, wherein the spacecraft has acquired Earth, the direction of Earth relative to the spacecraft defined by an Earth vector, and wherein the method of performing one or more rotations comprises rotating the spacecraft body about the Earth vector until the instantaneous Sun vector lies in the roll-yaw plane.

8. A system for acquiring Sun pointing in a three-axis stabilized spacecraft with roll, pitch, and yaw mutually orthogonal axes, wherein the spacecraft has a body, the Sun having an attitude relative to the body expressed as the instantaneous Sun vector, the Sun having an initial attitude relative to the body expressed as an initial Sun vector and the Sun having a preferred attitude relative to the body expressed as a preferred final Sun vector, the system comprising:

at least one solar wing rotatively coupled to the spacecraft body;
a solar wing drive for each of the at least one solar wing, the drive operative to slew the solar wing relative to the spacecraft body;
a solar wing position sensor for each of the at least one solar wing, each position sensor operative to determine the rotational position of the solar wing relative to the spacecraft body;

at least one Sun sensor, each Sun sensor coupled to a solar wing so as to rotate with the solar wing, and each Sun sensor operable to detect the position of the Sun relative to the solar wing to which the Sun sensor is coupled;

a set of actuators operative to modify the attitude of the spacecraft body; and a control logic in communication with the at least one solar wing drive, at least one position sensor, at least one Sun sensor, and actuators;

wherein the control logic is operative to slew the at least one solar wing until the Sun is detected, determine the initial Sun vector, perform one or more rotations of the spacecraft body so as to bring the instantaneous Sun vector coincident with the preferred final Sun vector, wherein at least one rotation is about an optimal axis, and slew the at least one solar wing to the preferred attitude relative to the Sun.

9. A system for acquiring Sun pointing as in claim 8, the control logic operative to simultaneously perform one or more rotations of the spacecraft body and slew the at least one solar wing to the preferred attitude relative to the Sun.

10. A system for acquiring Sun pointing as in claim 8, wherein the at least one solar wing comprises a north solar wing extending generally from the negative pitch face of the spacecraft body and a south solar wing extending generally from the positive pitch face of the spacecraft body, wherein a north solar wing drive is operable to rotate the north solar wing and a south solar wing drive is operable to rotate the south solar wing, and wherein the control logic is operable to slew the north solar wing in the opposite rotational direction as the south solar wing.

11. A system for acquiring Sun pointing as in claim 8, wherein the at least one Sun sensor permits an initial Sun vector attitude which cannot be observed as the solar wings are slewed, the control logic further operable to slew the solar wings a first time up to one revolution, rotate the spacecraft body about an axis normal to the pitch axis if the first slew does not determine the initial Sun vector, and slew the solar wings a second time up to one revolution if the first slew did not determine the initial Sun vector.

12. A system for acquiring Sun pointing as in claim 8, the control logic operable to project the initial Sun vector onto the roll-yaw plane, determine the optimal axis of rotation by taking the cross product S of the initial Sun vector with the projection of the initial Sun vector onto the roll-yaw plane, rotate the spacecraft body about the optimal axis such that the instantaneous Sun vector is moved from the initial Sun vector to the projection of the initial Sun vector onto the roll-yaw plane, and rotate the spacecraft body about the pitch axis until the instantaneous Sun vector is coincident with the preferred final Sun vector.

13. A system for acquiring Sun pointing as in claim 8, the control logic operable to determine the optimal axis of rotation by taking the cross product of the initial Sun vector with the preferred final Sun vector and rotate the spacecraft body about the optimal axis until the instantaneous Sun vector is coincident with the preferred final Sun vector.

14. A system for acquiring Sun pointing as in claim 8, wherein the spacecraft has acquired Earth and wherein the direction of Earth relative to the spacecraft is defined by an Earth vector, the control logic operative to determine the Earth vector as the optimal axis and to rotate the spacecraft body about the optimal axis until the Sun vector lies in the roll-yaw plane.

* * * * *